(12) United States Patent
Miyazaki

(10) Patent No.: US 10,563,051 B2
(45) Date of Patent: Feb. 18, 2020

(54) RUBBER COMPOSITION FOR USE IN OUTER LAYER OF TIRE, AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/565,055

(22) PCT Filed: Apr. 11, 2016

(86) PCT No.: PCT/JP2016/061659
§ 371 (c)(1),
(2) Date: Oct. 6, 2017

(87) PCT Pub. No.: WO2016/171020
PCT Pub. Date: Oct. 27, 2016

(65) Prior Publication Data
US 2018/0105683 A1 Apr. 19, 2018

(30) Foreign Application Priority Data

Apr. 21, 2015 (JP) ................................. 2015-087003

(51) Int. Cl.
| | | |
|---|---|---|
| *C08L 21/00* | (2006.01) | |
| *C08K 5/11* | (2006.01) | |
| *B60C 1/00* | (2006.01) | |
| *C08K 3/06* | (2006.01) | |
| *C08L 101/00* | (2006.01) | |

(52) U.S. Cl.
CPC ............ *C08L 21/00* (2013.01); *B60C 1/0016* (2013.01); *B60C 1/0025* (2013.01); *C08K 3/06* (2013.01); *C08K 5/11* (2013.01); *C08L 101/00* (2013.01); *B60C 2001/005* (2013.01)

(58) Field of Classification Search
CPC .................................. C08K 5/11; C08L 21/00
See application file for complete search history.

(56) References Cited

U.S. PATENT DOCUMENTS

| 6,518,334 B1 * | 2/2003 | Calhoun .................. C08L 77/00 524/104 |
| 2007/0149688 A1 * | 6/2007 | Hochi ....................... B60C 1/00 524/493 |
| 2012/0016056 A1 | 1/2012 | Miyazaki |
| 2014/0155521 A1 | 6/2014 | Miyazaki |
| 2017/0174001 A1 * | 6/2017 | Miyazaki .................. B60C 1/00 |
| 2018/0179365 A1 * | 6/2018 | Konno ........................ C08J 3/09 |

FOREIGN PATENT DOCUMENTS

| CN | 1629214 A | 6/2005 |
| CN | 103732670 A | 4/2014 |
| EP | 2 740 757 A1 | 6/2014 |
| JP | 2004-137463 A | 5/2004 |
| JP | 2006-249230 A | 9/2006 |
| JP | 2007-277307 A | 10/2007 |
| JP | 2013-23568 A | 2/2013 |
| JP | 2015-34219 A | 2/2015 |

OTHER PUBLICATIONS

International Search Report, issued in PCT/JP2016/061659, PCT/ISA/210, dated Jun. 28, 2016.
Written Opinion of the International Searching Authority, issued in PCT/JP2016/061659, PCT/ISA/237, dated Jun. 28, 2016.
Machine Translation of JP-2004-137463-A published on May 13, 2004.
Machine Translation of JP-2007-277307-A published on Oct. 25, 2007.
Machine Translation of JP-2013-23568-A published on Feb. 4, 2013.
Machine Translation of JP-2015-34219-A published on Feb. 19, 2015.

* cited by examiner

*Primary Examiner* — Vickey Nerangis
(74) *Attorney, Agent, or Firm* — Birch, Stewart, Kolasch & Birch, LLP

(57) ABSTRACT

Provided are a rubber composition for outer layers of tires with which it is possible to reduce the amount of phosphorus used, and further to improve initial grip performance and grip performance during the middle phase of running while maintaining or improving good abrasion resistance, thereby achieving a balanced improvement in these properties, and a pneumatic tire formed from the rubber composition. The present invention relates to a rubber composition for outer layers of tires, containing a rubber component, a plasticizer, a resin having a softening point of 30° C. or higher, and sulfur, the plasticizer including an aliphatic polybasic acid ester having a freezing point of −50 to −10° C., the rubber composition containing, per 100 parts by mass of the rubber component, 0.5 to 50 parts by mass of the aliphatic polybasic acid ester and 2 parts by mass or more of the resin.

6 Claims, No Drawings

RUBBER COMPOSITION FOR USE IN OUTER LAYER OF TIRE, AND PNEUMATIC TIRE

TECHNICAL FIELD

The present invention relates to a rubber composition for outer layers of tires, and a pneumatic tire formed from the rubber composition.

BACKGROUND ART

Rubber compositions for outer layers of tires, which are used in treads or other outer components, incorporate resins having a high softening point in order to improve grip performance and adhesion. In order to counteract the increase in Hs at ambient temperatures caused by the use of such resins, low temperature plasticizers are added to the rubber compositions.

Phosphoric acid esters such as tris(2-ethylhexyl) phosphate (TOP) have generally been used as low temperature plasticizers. However, they disadvantageously cause a deterioration in abrasion resistance and a decrease in grip performance in high temperature conditions. In addition, they are expensive because phosphorus resources, which are found only in four countries in the world, tend to become depleted, and these resources are also important as fertilizers or key industrial materials.

When plasticizers such as TOP are not used, on the other hand, Hs at ambient temperature increases, resulting in a deterioration in conformity to the road surface and even in grip performance during the initial phase of running. Thus, there is a need to achieve a balanced improvement in grip performance and abrasion resistance while reducing the amount of phosphorus used.

SUMMARY OF INVENTION

Technical Problem

The present invention aims to solve the above problems and provide a rubber composition for outer layers of tires with which it is possible to reduce the amount of phosphorus used, and further to improve initial grip performance and grip performance during the middle phase of running while maintaining or improving good abrasion resistance, thereby achieving a balanced improvement in these properties, and also provide a pneumatic tire formed from the rubber composition.

Solution to Problem

The present invention relates to a rubber composition for outer layers of tires, containing a rubber component, a plasticizer, a resin having a softening point of 30° C. or higher, and sulfur, the plasticizer including an aliphatic polybasic acid ester having a freezing point of −50 to −10° C., the rubber composition containing, per 100 parts by mass of the rubber component, 0.5 to 50 parts by mass of the aliphatic polybasic acid ester and 2 parts by mass or more of the resin.

The aliphatic polybasic acid ester preferably has an SP value of 8.4 to 9.5.

The plasticizer preferably has a flash point of 200° C. or higher.

The plasticizer is preferably free from phosphorus.

Preferably, the resin has a softening point of 80° C. or higher, and the resin is present in an amount of 5 to 100 parts by mass per 100 parts by mass of the rubber component.

The aliphatic polybasic acid ester is preferably bis[2-(2-butoxyethoxy)ethyl] adipate.

The rubber composition for outer layers of tires is preferably a rubber composition for treads, sidewalls, or clinches.

The present invention also relates to a pneumatic tire, formed from the rubber composition for outer layers of tires.

Advantageous Effects of Invention

The rubber composition for outer layers of tires according to the present invention contains predetermined amounts of a rubber component, a plasticizer including an aliphatic polybasic acid ester having a predetermined freezing point, a resin having a predetermined softening point, and sulfur. With such a rubber composition, it is possible to reduce the amount of phosphorus used, and further to improve initial grip performance and grip performance during the middle phase of running while maintaining or improving good abrasion resistance, thereby achieving a balanced improvement in these properties.

DESCRIPTION OF EMBODIMENTS

The rubber composition for outer layers of tires of the present invention contains a rubber component, a plasticizer including an aliphatic polybasic acid ester having a freezing point of −50 to −10° C., a resin having a softening point of 30° C. or higher, and sulfur. The aliphatic polybasic acid ester and the resin are present in predetermined amounts.

According to the present invention, since an aliphatic polybasic acid ester having a predetermined freezing point, not phosphoric acid esters such as TOP, is used as a plasticizer in combination with a resin having a softening point of 30° C. or higher, the plasticizer, the resin, and the rubber component have better dispersibility, and the adhesive layer formed on the tread surface provides improved grip performance over a wide temperature range from ambient temperature to elevated temperature. Thus, it is possible to improve initial grip performance and grip performance during the middle phase of running while maintaining or improving good abrasion resistance, thereby achieving a balanced improvement in these properties. Further, it is also possible to reduce the use of phosphorus, which is a depleting resource.

Non-limiting examples of rubbers that can be used in the rubber component in the present invention include isoprene-based rubbers such as natural rubber (NR), highly purified NR (UPNR), deproteinized NR (DPNR), epoxidized NR (ENR), and polyisoprene rubber (IR); styrene-butadiene rubber (SBR), polybutadiene rubber (BR), styrene-isoprene-butadiene rubber (SIBR), chloroprene rubber (CR), acrylonitrile butadiene rubber (NBR), and butyl rubber (IIR). Among these, NR, SBR, and BR are preferred, with SBR or BR being more preferred. Particularly in view of grip performance and abrasion resistance, SBR is suitable. Particularly suitable is a combination of SBR and BR.

The term "grip performance" as used alone herein collectively refers to initial grip performance and grip performance during the middle phase of running.

Any styrene-butadiene rubber (SBR) may be used, and examples include emulsion polymerized SBR (E-SBR) and solution polymerized SBR (S-SBR) all of which may or may not be oil extended. Particularly in view of grip performance, oil extended high molecular weight SBR is preferred. Modified SBR such as chain end-modified S-SBR or main chain-modified S-SBR, which shows enhanced interaction with fillers, may also be suitably used. These types of SBR may be used alone or in combinations of two or more.

The modified SBR is preferably one coupled with tin or silicon, for example. The modified SBR may be produced by common coupling methods, such as by reacting the alkali metal (e.g. Li) or alkaline earth metal (e.g. Mg) of the molecular chain end of SBR to be modified with, for example, a tin halide or silicon halide.

The modified SBR is also preferably a copolymer of styrene and butadiene that contains a primary amino group or an alkoxysilyl group. The primary amino group may be bonded to any of the polymerization initiating terminal, the polymerization terminating terminal, the main chain of the polymer, and the side chain. However, it is preferably introduced to the polymerization initiating terminal or the polymerization terminating terminal in that the disappearance of energy is inhibited from the polymer terminal to be able to improve hysteresis loss characteristics.

The modified SBR may suitably be one obtained particularly by modifying the polymerizing end (active end) of solution polymerized styrene-butadiene rubber (S-SBR) with a compound represented by the formula (I) below (modified S-SBR (modified SBR disclosed in JP 2010-111753 A)). In this case, the molecular weight of the polymer can be easily controlled, and thus the amount of low molecular weight components, which increase tan δ, can be reduced. In addition, the bond between the silica and the polymer chain can be reinforced to further improve grip performance, abrasion resistance, and other properties.

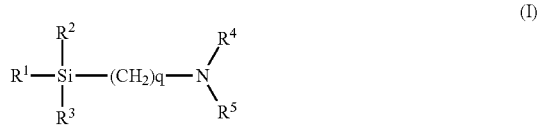

(I)

In formula (I), $R^1$, $R^2$, and $R^3$ are the same or different and each represent an alkyl group, an alkoxy group (preferably C1-C8, more preferably C1-C6, still more preferably C1-C4 alkoxy group), a silyloxy group, an acetal group, a carboxyl group (—COOH), a mercapto group (—SH), or a derivative thereof; $R^4$ and $R^5$ are the same or different and each represent a hydrogen atom or an alkyl group (preferably C1-C4 alkyl group); and q represents an integer (preferably of 1 to 5, more preferably 2 to 4, still more preferably 3).

Each of $R^1$, $R^2$, and $R^3$ is desirably an alkoxy group, and each of $R^4$ and $R^5$ is desirably an alkyl group. In such cases, excellent grip performance and excellent abrasion resistance can be obtained.

Specific examples of the compound of formula (I) include 3-aminopropyltrimethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-(N,N-dimethylamino)propyltrimethoxysilane. These compounds may be used alone or in combinations of two or more.

The modification of styrene-butadiene rubber with the compound (modifier) of formula (I) may be carried out by conventional methods, such as those disclosed in JP H06-53768 B, JP H06-57767 B, and JP 2003-514078 T. For example, the modification may be accomplished by bringing styrene-butadiene rubber into contact with the modifier, e.g.

as follows. After the synthesis of styrene-butadiene rubber by anionic polymerization, a predetermined amount of the modifier is added to the polymer rubber solution to react the polymerizing end (active end) of the styrene-butadiene rubber with the modifier. Alternatively, the modifier is added to a solution of styrene-butadiene rubber to react them.

The SBR preferably has a styrene content of 19% by mass or more, more preferably 21% by mass or more, still more preferably 25% by mass or more, particularly preferably 30% by mass or more. The styrene content is also preferably 60% by mass or less, more preferably 55% by mass or less, still more preferably 50% by mass or less, particularly preferably 45% by mass or less. When the styrene content is less than 19% by mass, insufficient grip performance may be obtained, while when the styrene content is more than 60% by mass, styrene groups may be located adjacent to one another so that the polymer becomes excessively hard, which can easily result in non-uniform crosslinking and therefore deteriorated durability; in addition, temperature dependence tends to increase so that larger changes in properties are obtained relative to changes in temperature, with the result that grip performance during the middle phase of running tends not to be well achieved.

The styrene content as used herein is determined by $^1$H-NMR analysis.

The SBR preferably has a vinyl content of 10% by mass or more, more preferably 20% by mass or more, still more preferably 25% by mass or more. When the vinyl content is less than 10% by mass, sufficient grip performance may not be obtained. The vinyl content is preferably 90% by mass or less, more preferably 80% by mass or less, still more preferably 70% by mass or less, particularly preferably 60% by mass or less. When the vinyl content is more than 90% by mass, such SBR is difficult to produce, and its yield may be unstable; in addition, grip performance or abrasion resistance may decrease, and thus unstable properties may be obtained.

The vinyl content (1,2-butadiene unit content) as used herein can be determined by infrared absorption spectrometry.

The SBR preferably has a glass transition temperature (Tg) of −45° C. or higher, more preferably −40° C. or higher. The Tg is preferably 10° C. or lower, more preferably 0° C. or lower.

The glass transition temperature as used herein is determined by differential scanning calorimetry (DSC) at a rate of temperature rise of 10° C./min in accordance with JIS K 7121.

The SBR preferably has a weight average molecular weight (Mw) of 200,000 or more, more preferably 300,000 or more, still more preferably 500,000 or more. The Mw is also preferably 2,000,000 or less, more preferably 1,800,000 or less. The use of SBR having a Mw of 200,000 or more can result in higher grip performance, fuel economy, durability, and abrasion resistance. An Mw of more than 2,000,000 may lead to poor filler dispersion and deteriorated durability.

The weight average molecular weight as used herein can be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

When SBR is incorporated, the amount of SBR based on 100% by mass of the rubber component is preferably 30% by mass or more, more preferably 50% by mass or more, still more preferably 60% by mass or more. When it is less than 30% by mass, grip performance tends to be insufficient. The upper limit of the amount of SBR is not particularly limited and may be 100% by mass, but is preferably 90% by mass or less, more preferably 80% by mass or less.

Any polybutadiene rubber (BR) may be used including, for example, high-cis content BR such as BR1220 available from Zeon Corporation, and BR130B and BR150B both available from Ube Industries, Ltd.; modified BR such as BR1250H available from Zeon Corporation; BR containing syndiotactic polybutadiene crystals such as VCR412 and VCR617 both available from Ube Industries, Ltd.; and BR synthesized using rare earth catalysts such as BUNA-CB25 available from Lanxess. These types of BR may be used alone or in combinations of two or more. In view of abrasion resistance, BR synthesized using rare earth catalysts (rare earth-catalyzed BR) is preferred among these.

The term "rare earth-catalyzed BR" refers to polybutadiene rubber synthesized using rare earth catalysts and characterized by high cis content and low vinyl content. The rare earth-catalyzed BR may be one commonly used in the production of tires.

The rare earth catalyst used in the synthesis of the rare earth-catalyzed BR may be a known one. Examples include catalysts containing lanthanide rare earth compounds, organoaluminum compounds, aluminoxanes, or halogen-containing compounds, optionally together with Lewis bases. Among these, neodymium (Nd) catalysts using Nd-containing compounds as lanthanide rare earth compounds are particularly preferred.

Examples of the lanthanide rare earth compounds include halides, carboxylates, alcoholates, thioalcoholates, and amides of rare earth metals of atomic numbers 57 to 71. Among these, Nd catalysts as described above are preferred because they allow the resulting BR to have high cis content and low vinyl content.

Examples of the organoaluminum compounds include compounds represented by the formula: $AlR^aR^bR^c$ wherein $R^a$, $R^b$, and $R^c$ are the same or different and each represent a hydrogen atom or a C1-C8 hydrocarbon group. Examples of the aluminoxanes include acyclic aluminoxanes and cyclic aluminoxanes. Examples of the halogen-containing compounds include aluminum halides represented by the formula: $AlX_kR^d_{3-k}$ wherein X represents a halogen atom, $R^d$ represents a C1-C20 alkyl, aryl, or aralkyl group, and k is 1, 1.5, 2, or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases may be used for complexation of lanthanide rare earth compounds, and suitable examples include acetylacetone, ketones, and alcohols.

In the polymerization of butadiene, the rare earth catalyst may be used in solution in an organic solvent (e.g. n-hexane, cyclohexane, n-heptane, toluene, xylene, or benzene) or may be supported on an appropriate carrier, such as silica, magnesia, or magnesium chloride. With regard to the polymerization conditions, the polymerization may be either solution polymerization or bulk polymerization, preferably at a polymerization temperature of −30 to 150° C., and the polymerization pressure may be chosen appropriately depending on other conditions.

The rare earth-catalyzed BR preferably has a cis-1,4-linkage content (cis content) of 90% by mass or more, more preferably 93% by mass or more, still more preferably 95% by mass or more. When the cis content is less than 90% by mass, durability or abrasion resistance tends to deteriorate.

The rare earth-catalyzed BR preferably has a vinyl content of 1.8% by mass or less, more preferably 1.5% by mass or less, still more preferably 1.0% by mass or less, particularly preferably 0.8% by mass or less. When the vinyl content is more than 1.8% by mass, durability or abrasion resistance tends to deteriorate.

The vinyl content (1,2-butadiene unit content) and cis content (cis 1,4-linkage content) of BR as used herein can be measured by infrared absorption spectrometry.

When BR is incorporated, the amount of BR based on 100% by mass of the rubber component is preferably 10% by mass or more, more preferably 20% by mass or more. The amount of BR is also preferably 70% by mass or less, more preferably 60% by mass or less. For use in tires requiring grip performance, it is preferably 40% by mass or less. When the amount of BR is less than 10% by mass or more than 70% by mass, abrasion resistance, grip performance, or fuel economy tends to be insufficient.

The NR may be one commonly used in the tire industry, such as SIR20, RSS #3, or TSR20.

The amount of NR based on 100% by mass of the rubber component is preferably 0 to 70% by mass, more preferably 0 to 30% by mass. When the amount of NR is outside the range indicated above, sufficient grip performance, abrasion resistance, or durability may not be obtained.

The combined amount of NR, SBR, and BR, preferably of SBR and BR, based on 100% by mass of the rubber component is preferably 80% by mass or more, more preferably 90% by mass or more, and may be 100% by mass. When it is within the range indicated above, the effects of the present invention can be better achieved.

The rubber composition of the present invention contains a plasticizer including an aliphatic polybasic acid ester having a freezing point of −50 to −10° C. The aliphatic polybasic acid ester having a predetermined freezing point has good compatibility both with the later-described resin having a softening point of 30° C. or higher and with the rubber component, and provides excellent grip performance during the initial and middle phases of running, and excellent abrasion resistance, with the result that the balance of these properties can be significantly improved. The aliphatic polybasic acid ester is also preferable from an environmental impact standpoint because it is not an essential phosphorus resource for organisms.

The aliphatic polybasic acid ester preferably has a freezing point of −40° C. or higher, more preferably −30° C. or higher. The freezing point is also preferably −15° C. or lower. When it is within the range indicated above, the effects of the present invention can be well achieved.

The freezing point as used herein is measured as follows. A sample is hermetically sealed in an aluminum cell, and the aluminum cell is inserted into a sample holder of a differential scanning calorimeter (DSC-60A available from Shimadzu Corporation). Then, an endothermic peak is observed while heating the sample holder up to 150° C. at a rate of 10° C./min in a nitrogen atmosphere. The endothermic peak is defined as the freezing point.

The aliphatic polybasic acid ester preferably has an SP value of 8.4 or more, more preferably 8.6 or more. The SP value is also preferably 9.5 or less, more preferably 9.0 or less, still more preferably 8.8 or less. When the SP value is within the range indicated above, compatibility with diene rubbers such as NR and SBR is ensured, and therefore excellent grip performance and excellent abrasion resistance can be obtained.

As used herein, the SP value means a solubility parameter determined using Hansen's equation.

Examples of the aliphatic polybasic acid ester include aliphatic dibasic acid esters and aliphatic tribasic acid esters. Among these, aliphatic dibasic acid esters such as adipic acid esters, azelaic acid esters, sebacic acid esters, maleic acid esters, and fumaric acid esters are preferred in order to better achieve the effects of the present invention.

Among these aliphatic dibasic acid esters, compounds represented by the following formula (1) can be particularly suitably used.

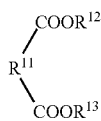

$$R^{11} \begin{matrix} COOR^{12} \\ \\ COOR^{13} \end{matrix} \quad (1)$$

In formula (1), $R^{11}$ represents a saturated or unsaturated divalent hydrocarbon group, and $R^{12}$ and $R^{13}$ are the same or different and each represent a branched or unbranched alkyl group or a group represented by $—(R^{14}—O)_n—R^{15}$ where the $R^{14}$ groups, whose number is n, are the same or different and each represent a branched or unbranched alkylene group, $R^{15}$ represents a branched or unbranched alkyl group, and n represents an integer.

The saturated or unsaturated divalent hydrocarbon group for $R^{11}$ may be branched or unbranched, and examples include alkylene groups, alkenylene groups, and arylene groups. The saturated or unsaturated hydrocarbon group preferably has 1 to 10 carbon atoms, more preferably 2 to 6 carbon atoms. Specific examples of alkylene groups include methylene, ethylene, propylene, butylene, pentylene, hexylene, heptylene, octylene, nonylene, and decylene groups. Specific examples of alkenylene groups include vinylene, 1-propenylene, and 2-propenylene groups. Specific examples of arylene groups include phenylene, tolylene, and xylylene groups.

The branched or unbranched alkyl group for $R^{12}$ or $R^{13}$ preferably has 1 to 15 carbon atoms, more preferably 4 to 10 carbon atoms. Specific examples include methyl, ethyl, n-propyl, isopropyl, n-butyl, iso-butyl, sec-butyl, tert-butyl, pentyl, hexyl, heptyl, octyl, nonyl, and decyl groups.

In the group represented by $—(R^{14}—O)_n—R^{15}$ for $R^{12}$ or $R^{13}$, the branched or unbranched alkylene group for $R^{14}$ preferably has 1 to 3 carbon atoms. The branched or unbranched alkyl group for $R^{15}$ preferably has 1 to 10 carbon atoms, more preferably 2 to 6 carbon atoms. Specific examples of the alkylene group and the alkyl group may be as described above. The symbol n is preferably an integer of 1 to 10, more preferably 1 to 5, still more preferably 1 to 3.

Preferably at least one of $R^{12}$ or $R^{13}$, more preferably both, is a group represented by $—(R^{14}—O)_n—R^{15}$ because in this case, the effects of the present invention can be better achieved.

Suitable examples of the aliphatic dibasic acid ester of formula (1) include bis(alkoxyalkoxyalkyl) adipates containing the group represented by $—(R^{14}—O)_n—R^{15}$, such as bis[2-(2-butoxyethoxy)ethyl] adipate. Other examples include di-n-butyl adipate and diisobutyl adipate. These may be used alone or in combinations of two or more.

The amount of the aliphatic polybasic acid ester having a freezing point of −50 to −10° C., per 100 parts by mass of the rubber component, is 0.5 parts by mass or more, preferably 1 part by mass or more, more preferably 3 parts by mass or more. If it is less than 0.5 parts by mass, the effects of the present invention may not be achieved. Also, the amount is 50 parts by mass or less, preferably 40 parts by mass or less, more preferably 30 parts by mass or less. When it is more than 50 parts by mass, grip performance or abrasion resistance may deteriorate.

The plasticizer may include other components in addition to the aliphatic polybasic acid ester having a freezing point of −50 to −10° C. Such other components include, for example, known plasticizers such as phosphoric acid esters and phthalic acid esters, and polyalkylene glycol alkyl ethers such as diethylene glycol monobutyl ether.

The concept of the "plasticizer" as used herein excludes various resins having a softening point of 30° C. or higher, including coumarone-indene resins, α-methylstyrene-based resins, terpene-based resins, p-t-butylphenol acetylene resins, styrene acrylic resins, and mixed resins containing C5 and C9 resins, which will be described later; and various oils such as rubber extending oils and process oils.

The proportion of the aliphatic polybasic acid ester based on 100% by mass of the plasticizer is preferably 80% by mass or more, more preferably 90% by mass or more, and may be 100% by mass. When the aliphatic polybasic acid ester is incorporated in a proportion indicated above, the effects of the present invention can be better achieved.

Since the plasticizer possibly ignites when introduced into the Banbury mixer, it is preferred that the total plasticizer have a flash point of 200° C. or higher. For example, when the discharge temperature during kneading is set to 180° C., the maximum temperature of the rubber composition will locally reach as high as approximately 195° C. Here, with the plasticizer having a flash point of 200° C. or higher, the risk of ignition is reduced.

As used herein, the flash point of the plasticizer is determined by the Cleveland open cup method in accordance with JIS K 2265-4:2007.

The total plasticizer preferably has a weight average molecular weight (Mw) of 400 or more in order to prevent its migration to the adjacent components and to increase the flash point. The Mw is not particularly limited, but is preferably 1,000 or less. The plasticizer having a Mw of more than 1,000 may have a reduced effect in plasticizing resins and rubbers.

Examples of the plasticizer including the aliphatic polybasic acid ester having a predetermined freezing point include BXA-N (bis[2-(2-butoxyethoxy)ethyl] adipate, freezing point: −19° C., flash point: 207° C., SP value: 8.70, Mw: 435), BXA-R (a mixture of bis[2-(2-butoxyethoxy) ethyl] adipate and diethylene glycol monobutyl ether (mass ratio=about 85:about 15), freezing point: −24° C., flash point: 145° C., SP value: 8.70, Mw: 394), DBA (dibutyl adipate, freezing point: −22° C., flash point: 161° C., SP value: 8.90, Mw: 258), and DIBA (diisobutyl adipate, freezing point: −22° C., flash point: 158° C., Mw: 258) all available from Daihachi Chemical Industry Co., Ltd.

The amount of the total plasticizer including the aliphatic polybasic acid ester having a predetermined freezing point, per 100 parts by mass of the rubber component, is preferably 0.5 parts by mass or more, more preferably 1 part by mass or more, still more preferably 3 parts by mass or more. When it is less than 0.5 parts by mass, the effects of the present invention may not be achieved. The amount is also preferably 50 parts by mass or less, more preferably 40 parts by mass or less, still more preferably 30 parts by mass or less. When it is more than 50 parts by mass, grip performance or abrasion resistance may deteriorate.

The rubber composition of the present invention contains a resin having a softening point of 30° C. or higher. This improves grip performance.

The softening point of the resin is preferably 60° C. or higher, more preferably 80° C. or higher. If it is lower than 30° C., the desired grip performance may not be achieved. The upper limit of the softening point is not particularly limited, but is preferably 160° C. or lower, more preferably 150° C. or lower. When it is higher than 160° C., the dispersibility of the resin may deteriorate, and thus grip performance or fuel economy may deteriorate.

As used herein, the softening point of the resin is determined as set forth in JIS K 6220-1:2001 with a ring and ball softening point measuring apparatus and is defined as the temperature at which the ball drops down.

The resin preferably has an SP value of 9.2 or more, more preferably 10 or more. The SP value is also preferably 13 or less, more preferably 12 or less. With an SP value falling within the range indicated above, the resin ensures compatibility with the rubber component and thus can be highly dispersed in rubber. When the SP value is more than 13, there is a disadvantage that the resin can be difficult to finely disperse in rubber, even though the plasticizer is used.

As used herein, the SP value means a solubility parameter determined using Hansen's equation.

The resin may be any resin commonly used in the tire industry, including, for example, coumarone-indene resins, α-methylstyrene-based resins, terpene-based resins, p-t-butylphenol acetylene resins, styrene acrylic resins, and mixed resins containing C5 and C9 resins. In order to better achieve the effects of the present invention, coumarone-indene resins, α-methylstyrene-based resins, terpene-based resins, and p-t-butylphenol acetylene resins are preferred among these.

The term "coumarone-indene resin" refers to a resin containing coumarone and indene as monomer components forming the backbone (main chain) of the resin. The backbone of the resin may contain, in addition to coumarone and indene, monomer components such as styrene, α-methylstyrene, methylindene, or vinyltoluene.

The coumarone-indene resin, if used, preferably has a softening point of 30 to 160° C. The upper limit of the softening point is more preferably 145° C. or lower, still more preferably 130° C. or lower. The lower limit is more preferably 60° C. or higher, still more preferably 80° C. or higher.

When the coumarone-indene resin used has a softening point of 90 to 140° C., grip performance is improved. Particularly the coumarone-indene resin having a softening point of 100 to 120° C. can overall increase tan δ over a range of 0 to 80° C., and also provides good durability. The reason why durability is improved by the use of the coumarone-indene resin is probably that the coumarone-indene resin imparts moderate sliding properties to the crosslinked polymer chains, allowing for their uniform elongation.

Examples of the α-methylstyrene-based resin include α-methylstyrene homopolymer and copolymers of α-methylstyrene and styrene.

The α-methylstyrene-based resin, if used, preferably has a softening point of 30 to 160° C. The upper limit of the softening point is more preferably 145° C. or lower, still more preferably 130° C. or lower. The lower limit is more preferably 50° C. or higher, still more preferably 70° C. or higher.

Examples of the terpene-based resin include polyterpene resins, terpene phenol resins, and aromatic modified terpene resins.

The term "polyterpene resin" refers to a resin produced by polymerizing a terpene compound, or a hydrogenated product thereof. The term "terpene compound" refers to a hydrocarbon represented by the compositional formula $(C_5H_8)_n$ or an oxygen-containing derivative thereof, each of which has a terpene basic skeleton and is classified into monoterpenes $(C_{10}H_{16})$ sesquiterpenes $(C_{15}H_{24})$, diterpenes $(C_{20}H_{32})$, and other terpenes. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resin include terpene resins made from the above-mentioned terpene compounds, such as α-pinene resin, β-pinene resin, limonene resin, dipentene resin, and β-pinene-limonene resin, and hydrogenated terpene resins obtained by hydrogenating the foregoing terpene resins. Examples of the terpene phenol resin include resins produced by copolymerization of the above-mentioned terpene compounds and phenolic compounds, and resins obtained by hydrogenating these resins. Specific examples include resins produced by condensation of the above-mentioned terpene compounds, phenolic compounds, and formaldehyde. Such phenolic compounds include, for example, phenol, bisphenol A, cresol, and xylenol. Examples of the aromatic modified terpene resin include resins obtained by modifying terpene resins with aromatic compounds, and resins obtained by hydrogenating these resins. Any aromatic compound that has an aromatic ring may be used. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; and coumarone and indene.

The terpene-based resin, if used, preferably has a softening point of 70 to 150° C. More preferably, the upper limit of the softening point is 145° C. or lower, while the lower limit is 80° C. or higher.

The amount of the resin per 100 parts by mass of the rubber component is 2 parts by mass or more, preferably 5 parts by mass or more, more preferably 10 parts by mass or more. If it is less than 2 parts by mass, grip performance may decrease. The amount is also preferably 100 parts by mass or less, more preferably 70 parts by mass or less, still more preferably 60 parts by mass or less. When it is more than 100 parts by mass, abrasion resistance or conformity to the road surface (initial grip performance) may decrease.

The rubber composition of the present invention contains sulfur. Examples of the sulfur include those commonly used in the rubber industry, such as powdered sulfur, precipitated sulfur, colloidal sulfur, insoluble sulfur, highly dispersible sulfur, and soluble sulfur.

In the rubber composition of the present invention, the amount of sulfur per 100 parts by mass of the rubber component is preferably 0.4 parts by mass or more, more preferably 0.6 parts by mass or more. The amount of sulfur is also preferably 2.5 parts by mass or less, more preferably 1.8 parts by mass or less. When it is less than 0.4 parts by mass, vulcanizate hardness (Hs) or co-curing with the neighboring rubber compounds may be insufficient. When it is more than 2.5 parts by mass, abrasion resistance may deteriorate. The amount of sulfur refers to the net amount of sulfur introduced in the final kneading. For example, when insoluble sulfur (containing oil) is used, it means the net amount of sulfur, excluding the oil content.

The rubber composition of the present invention may contain carbon black in view of reinforcing properties and grip performance.

The carbon black preferably has a nitrogen adsorption specific surface area ($N_2SA$) of 100 $m^2/g$ or more, more preferably 110 m²/g or more, still more preferably 115 m²/g or more, particularly preferably 140 m²/g or more. The $N_2SA$ is also preferably 600 m²/g or less, more preferably 500 m²/g or less, still more preferably 400 m²/g or less. When it is less than 100 m²/g, grip performance or abrasion resistance tends to decrease. When it is more than 600 m²/g, good filler dispersion is difficult to achieve, and therefore reinforcing properties or durability tends to deteriorate. The $N_2SA$ of the carbon black is determined by the BET method in accordance with JIS K 6217-2:2001.

The amount of carbon black varies depending on the desired grip performance, abrasion resistance, or fuel economy of the tire. In order to prevent UV-induced cracking, the amount of carbon black per 100 parts by mass of the rubber component is desirably 5 parts by mass or more. When silica is used to ensure wet grip performance, the amount of carbon black per 100 parts by mass of the rubber component is preferably about 5 to 50 parts by mass. When carbon black is used to ensure dry grip performance and abrasion resistance, the amount of carbon black per 100 parts by mass of the rubber component is preferably 50 to 160 parts by mass.

The rubber composition of the present invention may contain silica. This improves rolling resistance properties while enhancing wet grip performance and reinforcing properties. Examples of the silica include those produced by wet or dry processes.

The silica preferably has a nitrogen adsorption specific surface area ($N_2SA$) of 80 m²/g or more, more preferably 120 m²/g or more, still more preferably 150 m²/g or more. The $N_2SA$ is also preferably 280 m²/g or less, more preferably 260 m²/g or less, still more preferably 250 m²/g or less.

The $N_2SA$ of the silica is determined by the BET method in accordance with ASTM D3037-93.

In applications where wet grip performance is more important than dry grip performance, the amount of silica per 100 parts by mass of the rubber component is preferably 30 parts by mass or more, more preferably 60 parts by mass or more, still more preferably 75 parts by mass or more, further preferably 85 parts by mass or more, particularly preferably 90 parts by mass or more. When it is less than 30 parts by mass, sufficient reinforcing properties may not be obtained. The amount is also preferably 150 parts by mass or less, more preferably 130 parts by mass or less, still more preferably 120 parts by mass or less, particularly preferably 100 parts by mass or less. When it is more than 150 parts by mass, such silica is difficult to disperse, and therefore abrasion resistance or durability tends to deteriorate.

The rubber composition containing silica preferably further contains a silane coupling agent. The silane coupling agent may be any silane coupling agent that has conventionally been used together with silica in the rubber industry.

The rubber composition of the present invention may contain at least one inorganic filler selected from the group consisting of compounds represented by the formula below, magnesium sulfate, and silicon carbide. This provides good grip performance.

$$mM \cdot xSiO_y \cdot zH_2O$$

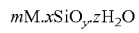

In the formula, M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

Examples of the compounds of the above formula include alumina, alumina hydrate, aluminum hydroxide, magnesium hydroxide, magnesium oxide, talc, titanium white, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, zirconium, and zirconium oxide. These inorganic compounds may be used alone or in combinations of two or more.

Preferred are inorganic fillers in which M is Al or Zr metal or an oxide or hydroxide of the metal because they have a Mohs hardness of 3 or more and show water resistance and oil resistance, and they, when processed into micron-sized particles, produce a scratching effect or they promote blooming of adhesive components which provide grip performance, thereby improving grip performance, and further because they also provide good processability, economic efficiency, and blowing resistance. More preferred is aluminum hydroxide or zirconium oxide because they are abundant and inexpensive resources. Aluminum hydroxide is particularly preferred as it further provides good kneading productivity and good extrusion processability.

The inorganic filler preferably has a nitrogen adsorption specific surface area ($N_2SA$) of 5 to 120 m²/g. When the $N_2SA$ is outside the above range, grip performance decreases and abrasion resistance deteriorates. The lower limit of the $N_2SA$ is more preferably 7 m²/g, while the upper limit of the $N_2SA$ is more preferably 115 m²/g, still more preferably 110 m²/g, particularly preferably 80 m²/g, most preferably 70 m²/g.

The $N_2SA$ of the inorganic filler is determined by the BET method in accordance with ASTM D3037-81.

The inorganic filler preferably has an average particle size of 1.5 μm or less, more preferably 0.69 μm or less, still more preferably 0.6 μm or less. The average particle size is also preferably 0.2 μm or more, more preferably 0.25 μm or more, still more preferably 0.4 μm or more. When it is more than 1.5 μm, grip performance may decrease and durability may deteriorate. The inorganic filler having an average particle size of less than 0.2 μm may easily form secondary aggregates in rubber, adversely resulting in reduced grip performance and deteriorated durability.

The average particle size of the inorganic filler refers to a number average particle size as measured with a transmission electron microscope.

When the inorganic filler is incorporated, the amount of the inorganic filler per 100 parts by mass of the rubber component is preferably 1 part by mass or more, more preferably 3 parts by mass or more, still more preferably 5 parts by mass or more. When it is less than 1 part by mass, grip performance (especially wet grip performance) can be insufficient. The amount is also preferably 70 parts by mass or less, more preferably 60 parts by mass or less, still more preferably 50 parts by mass or less, particularly preferably 40 parts by mass or less. An amount of more than 70 parts by mass can lead to insufficient filler dispersion and therefore poor grip performance (especially poor dry grip performance) or abrasion resistance.

Particularly for use in tires for passenger vehicles, the amount is preferably 10 to 20 parts by mass per 100 parts by mass of the rubber component in order to simultaneously achieve grip performance and abrasion resistance.

The rubber composition of the present invention may contain a process oil such as an aromatic, paraffinic, or naphthenic process oil. The amount of the process oil, if present, per 100 parts by mass of the rubber component is preferably 30 parts by mass or less, more preferably 25 parts by mass or less. When the amount is 30 parts by mass or less, grip, abrasion resistance, and tensile properties can be improved while ensuring a predetermined hardness, and further a dispersion torque can be easily imparted to fillers or inorganic fillers during kneading.

The rubber composition of the present invention may appropriately contain, in addition to the above-described components, compounding agents commonly used in the tire industry, such as waxes, zinc oxide, stearic acid, releasing agents, antioxidants, vulcanization accelerators, and other materials.

The rubber composition for outer layers of tires of the present invention can be prepared by conventional methods.

For example, first, components excluding sulfur and vulcanization accelerators are compounded (added) and kneaded in a rubber kneading machine such as a Banbury mixer or open roll mill to obtain a kneaded mixture (base kneading step). Subsequently, the sulfur and vulcanization accelerators are further compounded with (added to) the kneaded mixture and kneaded, followed by vulcanization, whereby the rubber composition can be prepared.

The rubber composition of the present invention is a rubber composition for outer layers of tires which forms a surface (outer surface) of a tire such as a tread, wing, sidewall, or clinch. It can be more suitably used in treads, sidewalls, or clinches, still more suitably in treads, among others.

The pneumatic tire of the present invention can be formed from the rubber composition by usual methods.

Specifically, the rubber composition containing the components described above, before vulcanization, is extruded and processed into the shape of a tire component such as a tread, wing, sidewall, or clinch and then assembled with other tire components on a tire building machine in a usual manner to build an unvulcanized tire. The unvulcanized tire is heat pressed in a vulcanizer to produce a tire.

EXAMPLES

The present invention will be specifically described below with reference to, but not limited to, examples.

The chemicals used in the examples and comparative examples are listed below.

<NR>
TSR20 (SP value: 8.05)
<SBR>
Modified SBR: a product prepared as described later (oil extended [oil content: 37.5 parts by mass per 100 parts by mass of rubber solids], styrene content: 41% by mass, vinyl content: 40% by mass, glass transition temperature: −29° C., weight average molecular weight: 1,190,000, SP value: 8.60)

Modified SBR for silica: a product prepared as described later (non-oil extended, styrene content: 27% by mass, vinyl content: 58% by mass, glass transition temperature: −27° C., weight average molecular weight: 720,000, SP value: 8.55)
<BR>
CB25: BUNA-CB25 (rare earth-catalyzed BR synthesized using Nd catalyst, vinyl content: 0.7% by mass, cis content: 97% by mass, glass transition temperature: −110° C., SP value: 8.20) available from Lanxess
<Filler>
HP180: HP180 (carbon black, $N_2SA$: 175 $m^2/g$, CTAB specific surface area: 181 $m^2/g$) available from Orion Engineered Carbons VN3: ULTRASIL VN3 (silica, $N_2SA$: 175 $m^2/g$) available from Evonik
<Silane Coupling Agent>
Si75: Silane coupling agent Si75 (bis(3-triethoxysilylpropyl)disulfide) available from Evonik <Aluminum Hydroxide>
ATH # B: ATH # B (aluminum hydroxide, average particle size: 0.6 μm, $N_2SA$: 15 $m^2/g$) available from Sumitomo Chemical Co., Ltd.
<Resin>
Koresin: Koresin (p-t-butylphenol acetylene resin [condensation resin of p-t-butylphenol and acetylene], softening point: 145° C., Tg: 98° C., SP value: 10.8) available from BASF C120: Coumarone-indene resin (softening point: 120° C., Tg: 65° C., SP value: 9.00) available from Rutgers Chemicals M125: YS Polyster M125 (hydrogenated aromatic modified terpene resin, softening point: 125° C., Tg: 69° C., SP value: 8.52) available from Yasuhara Chemical Co., Ltd.

PX1150N: YS resin PX1150N (β-pinene resin, softening point: 115° C., Tg: 65° C., SP value: 8.26) available from Yasuhara Chemical Co., Ltd.

SA85: SYLVARES SA85 (α-methylstyrene-based resin [copolymer of α-methylstyrene and styrene], softening point: 85° C., Tg: 43° C., SP value: 9.10) available from Arizona Chemical C10: Liquid coumarone-indene resin (softening point: 10° C., Tg: −30° C., SP value: 8.70) available from Rutgers Chemicals
<Plasticizer>
BXA-N: Bis[2-(2-butoxyethoxy)ethyl] adipate (aliphatic dibasic acid ester, freezing point: −19° C., flash point: 207° C., SP value: 8.70, Mw: 435) available from Daihachi Chemical Industry Co., Ltd.

BXA-R: a mixture of bis[2-(2-butoxyethoxy)ethyl] adipate and diethylene glycol monobutyl ether (mass ratio=about 85:about 15), freezing point: −24° C., flash point: 145° C., SP value: 8.70, Mw: 394) available from Daihachi Chemical Industry Co., Ltd.

DIDA: Diisodecyl adipate (aliphatic dibasic acid ester, freezing point: −70° C. or lower, flash point: 229° C., SP value: 8.30, Mw: 427) available from Daihachi Chemical Industry Co., Ltd.

DOS: Bis(2-ethylhexyl) sebacate (aliphatic dibasic acid ester, freezing point: −62° C., flash point: 222° C., SP value: 8.50, Mw: 427) available from Daihachi Chemical Industry Co., Ltd.

TOP: Tris(2-ethylhexyl) phosphate (orthophosphoric acid ester, freezing point: −70° C. or lower, flash point: 204° C., SP value: 8.20, Mw: 435) available from Daihachi Chemical Industry Co., Ltd.

TBP: Tributyl phosphate (orthophosphoric acid ester, freezing point: −80° C. or lower, flash point: 160° C., SP value: 8.60, Mw: 266) available from Daihachi Chemical Industry Co., Ltd.

TCP: Tricresyl phosphate (orthophosphoric acid ester, freezing point: −20° C., flash point: 240° C., SP value: 9.70, Mw: 368) available from Daihachi Chemical Industry Co., Ltd.

CDP: Cresyl diphenyl phosphate (orthophosphoric acid ester, freezing point: −30° C., flash point: 240° C., SP value: 9.10, Mw: 340) available from Daihachi Chemical Industry Co., Ltd.

DOP: Bis(2-ethylhexyl) phthalate (phthalic acid ester, freezing point: −51° C., flash point: 218° C., SP value: 8.90, Mw: 391) available from Daihachi Chemical Industry Co., Ltd.

DEP: Diethyl phthalate (phthalic acid ester, freezing point: −5° C., flash point: 162° C., SP value: 9.9, Mw: 222) available from Daihachi Chemical Industry Co., Ltd.

<Process Oil>
TDAE oil: Vivatec 400 (Tg: −58° C., SP value: 8.05) available from H&R
Paraffin oil: Diana Process PA32 (Tg: −64° C., SP value: 7.80) available from Idemitsu Kosan Co., Ltd.
<Antioxidant>
Wax: Ozoace 355 available from Nippon Seiro Co., Ltd.
6PPD: Antigene 6C (N-phenyl-N'-(1,3-dimethyl)-p-phenylenediamine) available from Sumitomo Chemical Co., Ltd.
TMQ: NOCRAC 224 (2,2,4-trimethyl-1,2-dihydroquinoline polymer) available from Ouchi Shinko Chemical Industrial Co., Ltd.
<Auxiliary Agent>
Stearic acid: Stearic acid "TSUBAKI" available from NOF Corporation
Processing aid: WB16 (a mixture of fatty acid metal salt (fatty acid calcium salt) and fatty acid amide) available from Struktol
Zinc oxide: Ginrei R available from Toho Zinc Co., Ltd.
<Vulcanizing Agent>
5% oil-containing powder sulfur: HK-200-5 available from Hosoi Chemical Industry Co., Ltd.
DPG: NOCCELER D (1,3-diphenylguanidine) available from Ouchi Shinko Chemical Industrial Co., Ltd.
TBBS: NOCCELER NS-G (N-tert-butyl-2-benzothiazolyl-sulfenamide) available from Ouchi Shinko Chemical Industrial Co., Ltd.
TBZTD: Perkacit TBZTD (tetrabenzyl thiuram disulfide) available from Flexsys
(Preparation of Chain End Modifier for SBR)
A 250 mL measuring flask in a nitrogen atmosphere was charged with 20.8 g of 3-(N,N-dimethylamino)propyltrimethoxysilane (available from AZmax. Co.) and then with anhydrous hexane (available from Kanto Chemical Co., Inc.) to give a total amount of 250 mL, whereby a chain end modifier was prepared.
(Preparation of Modified SBR)
A sufficiently nitrogen-purged 30 L pressure-resistant vessel was charged with 18 L of n-hexane, 800 g of styrene (available from Kanto Chemical Co., Inc.), 1,200 g of butadiene, and 1.1 mmol of tetramethylethylenediamine, and then the temperature was raised to 40° C. Next, 1.8 mL of 1.6 M butyllithium (available from Kanto Chemical Co., Inc.) was added to the mixture, and then the temperature was raised to 50° C., followed by stirring for three hours. Subsequently, 4.1 mL of the chain end modifier was added to the resulting mixture, followed by stirring for 30 minutes. To the reaction solution were added 15 mL of methanol and 0.1 g of 2,6-tert-butyl-p-cresol (available from Ouchi Shinko Chemical Industrial Co., Ltd.), and then 1,200 g of TDAE, followed by stirring for ten minutes. Thereafter, aggregates were recovered from the polymer solution by steam stripping. The aggregates were dried under reduced pressure for 24 hours to obtain a modified SBR.
(Preparation of Modified SBR for Silica)
A sufficiently nitrogen-purged 30 L pressure-resistant vessel was charged with 18 L of n-hexane, 740 g of styrene (available from Kanto Chemical Co., Inc.), 1,260 g of butadiene, and 10 mmol of tetramethylethylenediamine, and then the temperature was raised to 40° C. Next, 10 mL of butyllithium was added to the mixture, and then the temperature was raised to 50° C., followed by stirring for three hours. Subsequently, 11 mL of the chain end modifier was added to the resulting mixture, followed by stirring for 30 minutes. To the reaction solution were added 15 mL of methanol and 0.1 g of 2,6-tert-butyl-p-cresol. Thereafter, the reaction solution was put in a stainless steel vessel containing 18 L of methanol, from which aggregates were then recovered. The aggregates were dried under reduced pressure for 24 hours to obtain a modified SBR for silica.

Examples and Comparative Examples

According to the formulation and the kneading conditions of each example listed in Table 1, the entire amounts of the chemicals other than the vulcanizing agents were first kneaded for five minutes at a discharge temperature of 150° C. in a 4 L Banbury mixer. However, in Example 2 and Comparative Examples 5 and 13 in which BXA-R, TBP, or DEP was used as the plasticizer, the kneading was carried out for five minutes at a discharge temperature of 140° C. in order to prevent ignition.

Then, the vulcanizing agents were added to the kneaded mixture, and they were kneaded for three minutes in an open roll mill to obtain an unvulcanized rubber composition. During this step, the maximum rubber temperature was 100° C.

The unvulcanized rubber composition was shaped into a tread, assembled with other tire components on a tire building machine, and press-vulcanized at 170° C. for 12 minutes to obtain a test tire (tire size: 245/40R18).

The test tires prepared as above were evaluated as follows. Table 1 shows the results.
(Initial Grip Performance)
The test tires were mounted on a front-engine, rear-wheel-drive car of 2,000 cc displacement made in Japan. A test driver drove the car 10 laps around a test track with dry asphalt road conditions and then evaluated the control stability during steering on the second lap. The results are expressed as an index (initial grip performance index), with Comparative Example 1 set equal to 100. A higher index indicates higher initial grip performance. Tires with an index of 105 or higher are considered good.
(Grip Performance During Middle Phase of Running)
The test tires were mounted on a front-engine, rear-wheel-drive car of 2,000 cc displacement made in Japan. A test driver drove the car 10 laps around a test track with dry asphalt road conditions and then compared the control stability during steering on the lap with the best lap time with that on the final lap to make an evaluation. The results are expressed as an index, with Comparative Example 1 set equal to 100. A higher index indicates a smaller deterioration in grip performance on dry roads during the middle phase of running, which means that stable grip performance during the middle phase of running is well achieved. Tires with an index of 105 or higher are considered good.
(Abrasion Resistance)
The test tires were mounted on a front-engine, rear-wheel-drive car of 2,000 cc displacement made in Japan. The car was subjected to a 500 km long run at the Okayama International Circuit in Japan. The run was carried out under dry road conditions at a road temperature of 20 to 30° C.

After the run, the remaining groove depth in the tire tread rubber (initial depth: 8.0 mm) was measured to evaluate abrasion resistance. A larger average depth of the remaining main grooves indicates better abrasion resistance. The remaining groove depths are expressed as an index, with Comparative Example 1 set equal to 100. A higher index indicates better abrasion resistance.

TABLE 1

| | | Freezing point (plasticizer) or Tg (resin or process oil) | SP value | Ex. 1 | Ex. 2 | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|---|---|---|---|
| Formulation (parts by mass) | NR | TSR20 | | 8.05 | | | | | | | | | | |
| | SBR | Modified SBR | | 8.6 | 41.25 | 41.25 | 41.25 | 41.25 | 41.25 | 41.25 | 41.25 | 41.25 | 41.25 | 41.25 |
| | | Modified SBR for silica | | 8.55 | 40 | 40 | 40 | 40 | 40 | 40 | 40 | 40 | 40 | 40 |
| | BR | CB25 | | 8.2 | | | | | | | | | | |
| | Filler | HP180 | | | 30 | 30 | 30 | 30 | 30 | 30 | 30 | 30 | 30 | 30 |
| | | VN3 | | | 10 | 10 | 10 | 10 | 10 | 10 | 10 | 10 | 10 | 10 |
| | Silane coupling agent | Si75 | | | 90 | 90 | 90 | 90 | 90 | 90 | 90 | 90 | 90 | 90 |
| | | | | | 7.2 | 7.2 | 7.2 | 7.2 | 7.2 | 7.2 | 7.2 | 7.2 | 7.2 | 7.2 |
| | Aluminum hydroxide | ATH#B | | | 0 | 0 | 0 | 0 | 0 | 0 | 0 | 0 | 0 | 0 |
| | Resin | Koresin | 98 | 10.8 | | | | | | | | | | |
| | | C120 | 65 | 9.0 | | | | | | | | | | |
| | | M125 | 69 | 8.52 | | | | | | | | | | |
| | | PX1150N | 65 | 8.26 | | | | | | | | | | |
| | | SA85 | 43 | 9.1 | 15 | 15 | 15 | 15 | 15 | 15 | 15 | 15 | 15 | 15 |
| | | C10 | −30 | 8.7 | | | | | | | | | | |
| | Plasticizer | BXA-N | −19 | 8.7 | 5 | | | | | | | | | |
| | | BXA-R | −24 | 8.7 | | 5 | | | | | | | | |
| | | DIDA | −70 or lower | 8.3 | | | | 5 | | | | | | |
| | | DOS | −62 | 8.5 | | | | | 5 | | | | | |
| | | TOP | −70 or lower | 8.2 | | | | | | 5 | | | | |
| | | TBP | −80 or lower | 8.6 | | | | | | | 5 | | | |
| | | TCP | −20 | 9.7 | | | | | | | | 5 | | |
| | | CDP | −30 | 9.1 | | | | | | | | | 5 | |
| | | DOP | −51 | 8.9 | | | | | | | | | | |
| | | DEP | −5 | 9.9 | | | | | | | | | | 5 |
| | Process oil | TDAE oil | −58 | 8.05 | 5 | 5 | 10 | 5 | 5 | 5 | 5 | 5 | 5 | 5 |
| | | Paraffin oil | −64 | 7.8 | | | | | | | | | | |
| | Antioxidant | Wax | | | 1.5 | 1.5 | 1.5 | 1.5 | 1.5 | 1.5 | 1.5 | 1.5 | 1.5 | 1.5 |
| | | 6PPD | | | 3 | 3 | 3 | 3 | 3 | 3 | 3 | 3 | 3 | 3 |
| | | TMQ | | | 1 | 1 | 1 | 1 | 1 | 1 | 1 | 1 | 1 | 1 |
| | Auxiliary agent | Stearic acid | | | 3 | 3 | 3 | 3 | 3 | 3 | 3 | 3 | 3 | 3 |
| | | Processing aid | | | 2.5 | 2.5 | 2.5 | 2.5 | 2.5 | 2.5 | 2.5 | 2.5 | 2.5 | 2.5 |
| | | Zinc oxide | | | 1.3 | 1.3 | 1.3 | 1.3 | 1.3 | 1.3 | 1.3 | 1.3 | 1.3 | 1.3 |
| | Vulcanizing agent | 5% oil-containing powder sulfur | | | 2.0 | 2.0 | 2.0 | 2.0 | 2.0 | 2.0 | 2.0 | 2.0 | 2.0 | 2.0 |
| | | DPG | | | 2.0 | 2.0 | 2.0 | 2.0 | 2.0 | 2.0 | 2.0 | 2.0 | 2.0 | 2.0 |
| | | TBBS | | | | | | | | | | | | |
| | | TBZTD | | | | | | | | | | | | |
| Tire properties | | Hs Shore(A) | | | Each formulation was adjusted at 60-62 | | | | | | | | | |
| | | Initial grip | | | 110 | 107 | 100 | 106 | 104 | 102 | 102 | 102 | 100 | 107 |

TABLE 1-continued

| | Com. Ex. 9 | Com. Ex. 10 | Com. Ex. 11 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Grip performance (target ≥105) | 110 | | 108 | 100 | 104 | 102 | 101 | 100 | 100 | 97 | 104 |
| Grip performance during middle phase of running (target ≥105) | | 102 | 100 | 100 | 98 | 95 | 86 | 89 | 90 | 87 | 102 |
| Abrasion resistance (target ≥100) | 102 | | 100 | 100 | 103 | 100 | 96 | 97 | 97 | 95 | 104 |
| Overall properties (average of three properties) (target ≥105) | 107 | 105 | 100 | 103 | 100 | 96 | 97 | 97 | 95 | 104 | |

| Formulation (parts by mass) | | Com. Ex. 9 | Com. Ex. 10 | Com. Ex. 11 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| NR | TSR20 | 70 | | | | | | | | | | |
| SBR | Modified SBR | | 41.25 | 41.25 | 41.25 | 41.25 | 41.25 | 41.25 | 41.25 | 41.25 | 41.25 | 41.25 |
| | Modified SBR for silica | 30 | 40 | 40 | 40 | 40 | 40 | 40 | 40 | 40 | 40 | 40 |
| BR | CB25 | 30 | 30 | 30 | 30 | 30 | 30 | 30 | 30 | 30 | 30 | 30 |
| Filler | HP180 | 30 | 10 | 10 | 10 | 10 | 10 | 10 | 10 | 10 | 10 | 10 |
| | VN3 | 110 | 90 | 90 | 90 | 90 | 90 | 90 | 90 | 90 | 90 | 90 |
| Silane coupling agent | Si75 | 8.8 | 7.2 | 7.2 | 7.2 | 7.2 | 7.2 | 7.2 | 7.2 | 7.2 | 7.2 | 7.2 |
| Aluminum hydroxide | ATH#B | 0 | 0 | 0 | 0 | 0 | 10 | 0 | 0 | 0 | 0 | 10 |
| Resin | Koresin | | | | | | | | | | 15 | |
| | C120 | | | | | | | 15 | | | | |
| | M125 | | | | | | | | 15 | | | |
| | PX1150N | | | | | | | | | 15 | | |
| | SA85 | 15 | 15 | 15 | 15 | 15 | 2 | 5 | 5 | 5 | 5 | 15 |
| | C10 | | 5 | | 8 | | | | | | | 5 |
| Plasticizer | BXA-N | | | | 2 | | | | | | | |
| | BXA-R | | | | | | | | | | | |
| | DIDA | | | | | | | | | | | |
| | DOS | | | | | | | | | | | |
| | TOP | | | | | | | | | | | |
| | TBP | | | | | | | | | | | |
| | TCP | | | | | | | | | | | |
| | CDP | | | | | | | | | | | |
| | DOP | | | | | | | | | | | |
| | DEP | | | | | | | | | | | |
| Process oil | TDAE oil | 52 | | | | 10 | 18 | 5 | 5 | 5 | 5 | 5 |
| | Paraffin oil | 0 | 0 | 10 | | | | | | | | |
| Antioxidant | Wax | 1.5 | 1.5 | 1.5 | 1.5 | 1.5 | 1.5 | 1.5 | 1.5 | 1.5 | 1.5 | 1.5 |

TABLE 1-continued

|  |  |  | Ex. 11 | Ex. 12 | Ex. 13 | Ex. 14 | Ex. 15 | Ex. 12 | Ex. 16 | Ex. 13 |
|---|---|---|---|---|---|---|---|---|---|---|
| Auxiliary agent | 6PPD | 3 | 3 | 3 | 3 | 3 | 3 | 3 | 3 | 3 |
|  | TMQ | 1 | 1 | 1 | 1 | 1 | 1 | 1 | 1 | 1 |
|  | Stearic acid | 3 | 3 | 3 | 3 | 3 | 3 | 3 | 3 | 3 |
|  | Processing aid | 2.5 | 2.5 | 2.5 | 2.5 | 2.5 | 2.5 | 2.5 | 2.5 | 2.5 |
|  | Zinc oxide | 1.3 | 1.3 | 1.3 | 1.3 | 1.3 | 1.3 | 1.3 | 1.3 | 1.3 |
| Vulcanizing agent | 5% oil-containing powder sulfur | Each formulation was adjusted at 60-62 | | | | | | | | |
|  | DPG | 2.0 | 2.0 | 2.0 | 2.0 | 2.0 | 2.0 | 2.0 | 2.0 | 2.0 |
|  | TBBS | 2.0 | 2.0 | 2.0 | 2.0 | 2.0 | 2.0 | 2.0 | 2.0 | 2.0 |
|  | TBZTD |  |  |  |  |  |  |  |  |  |
| Tire properties | Hs Shore(A) | 103 | 105 | 110 | 108 | 107 | 114 | 115 | 110 | 116 |
|  | Initial grip performance (target ≥ 105) | 102 | 105 | 109 | 106 | 106 | 113 | 114 | 110 | 116 |
|  | Grip performance during middle phase of running (target ≥ 105) | 110 | 105 | 106 | 100 | 107 | 107 | 100 | 108 | 100 |
|  | Abrasion resistance (target ≥ 100) | 105 | 105 | 108 | 105 | 107 | 111 | 110 | 109 | 111 |
|  | Overall properties (average of three properties) (target ≥ 105) |  |  |  |  |  |  |  |  |  |

| Formulation (parts by mass) |  |  | Ex. 11 | Ex. 12 | Ex. 13 | Ex. 14 | Ex. 15 | Ex. 12 | Ex. 16 | Ex. 13 |
|---|---|---|---|---|---|---|---|---|---|---|
|  | NR | TSR20 | 10 |  |  |  |  |  |  |  |
|  | SBR | Modified SBR | 41.25 | 82.5 | 41.25 | 41.25 | 41.25 | 41.25 | 82.5 | 41.25 |
|  |  | Modified SBR for silica | 40 | 40 | 40 | 40 | 10 | 40 | 40 | 40 |
|  | BR | CB25 | 20 |  |  |  |  |  |  |  |
|  | Filler | HP180 | 17 | 50 | 30 | 30 | 60 | 30 | 50 | 30 |
|  |  | VN3 | 80 | 70 | 10 | 10 | 10 | 10 | 70 | 10 |
|  |  | Si75 | 6.4 | 5.6 | 90 | 90 | 90 | 90 | 5.6 | 90 |
|  | Silane coupling agent |  |  |  | 7.2 | 7.2 | 7.2 | 7.2 |  | 7.2 |
|  | Aluminum hydroxide | ATH#B | 0 | 10 | 0 | 0 | 20 | 0 |  | 0 |
|  | Resin | Koresin |  | 20 | 10 | 15 |  | 15 | 30 |  |
|  |  | C120 | 15 |  |  |  |  |  |  |  |
|  |  | M125 |  | 15 |  | 15 |  | 15 | 15 |  |
|  |  | PX1150N | 15 |  |  |  |  |  |  |  |
|  |  | SA85 |  |  |  |  | 15 |  |  | 15 |

TABLE 1-continued

| | | 1 | 2 | 3 | 4 | 5 | 6 | 7 | 8 |
|---|---|---|---|---|---|---|---|---|---|
| Plasticizer | C10 | | | | | | | | |
| | BXA-N | 5 | | | | | | | |
| | BXA-R | | 30 | | | | | | |
| | DIDA | | | 10 | | | | | |
| | DOS | | | 5 | | | | | |
| | TOP | | | | 10 | | | | |
| | TBP | | | | | | 10 | | |
| | TCP | | | | | 5 | | | |
| | CDP | | | | | | | | 5 |
| | DOP | | | | | | | | 5 |
| | DEP | | | | | | | 40 | |
| Process oil | TDAE oil | 5 | 0 | 0 | 0 | 5 | 0 | 0 | 0 |
| | Paraffin oil | | | | | | | | |
| Antioxidant | Wax | 1.5 | 1.5 | 1.5 | 1.5 | 1.5 | 1.5 | 1.5 | 1.5 |
| | 6PPD | 3 | 3 | 3 | 3 | 3 | 3 | 3 | 3 |
| | TMQ | 1 | 1 | 1 | 1 | 1 | 1 | 1 | 1 |
| Auxiliary agent | Stearic acid | 3 | 3 | 3 | 3 | 3 | 3 | 3 | 3 |
| | Processing aid | | 2 | | | | | | |
| | Zinc oxide | 2.5 | 2.5 | 2.5 | 2.5 | 2.5 | 2.5 | 2.5 | 2.5 |
| Vulcanizing agent | 5% oil-containing powder sulfur | 1.3 | 1.0 | 1.3 | 1.3 | 1.3 | 1.3 | 1.5 | 1.3 |
| | DPG | 2.0 | 1.5 | 2.0 | 2.0 | 2.0 | 2.0 | 2.0 | 2.0 |
| | TBBS | 2.0 | 3.0 | 2.0 | 2.0 | 2.0 | 2.0 | 2.0 | 2.0 |
| | TBZTD | | 1 | | | | | | |
| Tire properties | Hs Shore(A) | Each formulation was adjusted at 60-62 | | | | | | | |
| | Initial grip performance (target ≥ 105) | 114 | 127 | 114 | 126 | 110 | 117 | 120 | 101 |
| | Grip performance during middle phase of running (target ≥ 105) | 113 | 123 | 112 | 127 | 111 | 117 | 117 | 98 |
| | Abrasion resistance (target ≥ 100) | 100 | 100 | 112 | 105 | 140 | 91 | 100 | 88 |
| | Overall properties (average of three properties) (target ≥ 105) | 109 | 117 | 113 | 119 | 120 | 108 | 112 | 96 |

Table 1 demonstrates that in the examples using a sulfur-containing rubber composition containing predetermined amounts of an aliphatic polybasic acid ester having a predetermined freezing point and a resin having a predetermined softening point, the targeted initial grip performance, grip performance during the middle phase of running, and abrasion resistance were all achieved, and thus a balanced improvement in these properties was achieved.

The invention claimed is:

1. A rubber composition for outer layers of tires, comprising a rubber component, a plasticizer, a resin having a softening point of 80 to 150° C., and sulfur,
   wherein the rubber component includes styrene-butadiene rubber having a vinyl content of 25% by mass or more and a weight average molecular weight of 720,000 or lower,
   wherein the plasticizer includes an aliphatic polybasic acid ester,
   wherein the rubber composition comprises, per 100 parts by mass of the rubber component, 1 to 40 parts by mass of the aliphatic polybasic acid ester, and 2 parts by mass or more of the resin, and
   wherein the aliphatic polybasic acid ester is bis[2-(2-butoxyethoxy)ethyl]adipate.

2. The rubber composition for outer layers of tires according to claim 1,
   wherein the plasticizer has a flash point of 200° C. or higher.

3. The rubber composition for outer layers of tires according to claim 1,
   wherein the plasticizer is free from phosphorus.

4. The rubber composition for outer layers of tires according to claim 1,
   wherein the resin is present in an amount of 5 to 100 parts by mass per 100 parts by mass of the rubber component.

5. The rubber composition for outer layers of tires according to claim 1,
   which is a rubber composition for treads, sidewalls, or clinches.

6. A pneumatic tire, formed from the rubber composition for outer layers of tires according to claim 1.

* * * * *